US012698928B2

(12) United States Patent
Zhu

(10) Patent No.: US 12,698,928 B2
(45) Date of Patent: Aug. 4, 2026

(54) SEALING ASSEMBLY FOR EVAPORATOR

(71) Applicant: Guangzhou Xin'an Trading Co., Ltd., Guangzhou (CN)

(72) Inventor: Demin Zhu, Guangzhou (CN)

(73) Assignee: Guangzhou Xin'an Trading Co., Ltd., Guangzhou (CN)

( * ) Notice: Subject to any disclaimer, the term of this patent is extended or adjusted under 35 U.S.C. 154(b) by 0 days.

(21) Appl. No.: 19/017,768

(22) Filed: Jan. 12, 2025

(65) Prior Publication Data

US 2026/0063340 A1      Mar. 5, 2026

(30) Foreign Application Priority Data

Aug. 29, 2024   (CN) .......................... 202422121943.1
Sep. 6, 2024   (CN) .......................... 202422199009.1

(51) Int. Cl.
*F25B 39/02*          (2006.01)
*F16J 15/3284*        (2016.01)

(52) U.S. Cl.
CPC ........... *F25B 39/02* (2013.01); *F16J 15/3284* (2013.01)

(58) Field of Classification Search
CPC .... F25B 39/02; F16J 15/3284; F16J 15/3268; F16J 15/3276
See application file for complete search history.

(56) References Cited

U.S. PATENT DOCUMENTS

| | | | | |
|---|---|---|---|---|
| 2,929,551 A | * | 3/1960 | Heidorn | F04B 27/1036 |
| | | | | 277/390 |
| 3,659,827 A | | 5/1972 | Fogt | |
| 4,565,937 A | * | 1/1986 | Uhen | H02K 7/085 |
| | | | | 310/90 |
| 4,635,352 A | * | 1/1987 | Uhen | F16J 15/54 |
| | | | | 310/90 |
| 4,781,476 A | * | 11/1988 | Uhen | F16N 7/36 |
| | | | | 384/136 |
| 6,390,156 B1 | | 5/2002 | Hetherington et al. | |
| 6,553,779 B1 | | 4/2003 | Boyer et al. | |
| 7,016,026 B2 | | 3/2006 | DiFoggio et al. | |

(Continued)

FOREIGN PATENT DOCUMENTS

| | | |
|---|---|---|
| CN | 101000916 A | 7/2007 |
| CN | 101546476 A | 9/2009 |

(Continued)

*Primary Examiner* — Gilbert Y Lee
(74) *Attorney, Agent, or Firm* — Birch, Stewart, Kolasch & Birch, LLP

(57)          ABSTRACT

The application discloses a sealing assembly for an evaporator, relating to the technical field of cold drink dispenser device. The evaporator comprises an evaporator casing and an inner axial tube, with a rotating shaft disposed within the inner axial tube. The front end of the evaporator casing is provided with a front opening where sealing assembly is sleeved over the surface of the rotating shaft; the sealing assembly comprises an outer sleeve in contact with the rotating shaft, a through sleeve embedded around the outer sleeve, and a fixed sleeve disposed on the inner wall of the evaporator casing; the through sleeve passes through the front opening and is embedded in the fixed sleeve. The sealing assembly for the evaporator according to the application has the effects of strong durability and strong sealing performance.

10 Claims, 4 Drawing Sheets

(56) References Cited

U.S. PATENT DOCUMENTS

| | | |
|---|---|---|
| 2005/0221212 A1 | 10/2005 | Jubran et al. |
| 2008/0286469 A1 | 11/2008 | Baumbach et al. |
| 2011/0005972 A1 | 1/2011 | Kim et al. |
| 2012/0024658 A1 | 2/2012 | Fox |
| 2012/0045551 A1 | 2/2012 | Rugeris |
| 2012/0055189 A1 | 3/2012 | Sipp et al. |
| 2012/0099678 A1 | 4/2012 | Chang et al. |
| 2013/0239819 A1 | 9/2013 | Giua et al. |
| 2015/0052432 A1 | 2/2015 | Hsu et al. |
| 2015/0065638 A1 | 3/2015 | LiPiShan et al. |
| 2015/0135966 A1 | 5/2015 | Hulett et al. |
| 2017/0042180 A1 | 2/2017 | Bush |
| 2018/0039562 A1 | 2/2018 | Mochizuki et al. |
| 2018/0075359 A1 | 3/2018 | Brennan et al. |
| 2019/0320839 A1 | 10/2019 | Savenok |
| 2019/0357566 A1 | 11/2019 | Dong et al. |
| 2020/0107558 A1 | 4/2020 | Dong |
| 2021/0113621 A1 | 4/2021 | Centeno et al. |
| 2022/0099857 A1 | 3/2022 | Fan et al. |
| 2023/0184445 A1 | 6/2023 | Zhang et al. |
| 2023/0208049 A1 | 6/2023 | Hu |
| 2024/0078333 A1 | 3/2024 | Lim et al. |

FOREIGN PATENT DOCUMENTS

| | | |
|---|---|---|
| CN | 101820801 A | 9/2010 |
| CN | 102048016 A | 5/2011 |
| CN | 102052104 A | 5/2011 |
| CN | 102062641 A | 6/2011 |
| CN | 102415809 A | 4/2012 |
| CN | 102665434 A | 9/2012 |
| CN | 101778468 B | 12/2012 |
| CN | 202761055 U | 3/2013 |
| CN | 202875031 U | 4/2013 |
| CN | 203087446 U | 7/2013 |
| CN | 203132223 U | 8/2013 |
| CN | 203194450 U | 9/2013 |
| CN | 203194451 U | 9/2013 |
| CN | 203207109 U | 9/2013 |
| CN | 203314024 U | 12/2013 |
| CN | 203375571 U | 1/2014 |
| CN | 103658152 A | 3/2014 |
| CN | 103796562 A | 5/2014 |
| CN | 103096769 B | 7/2014 |
| CN | 104748458 A | 7/2015 |
| CN | 104839418 A | 8/2015 |
| CN | 103390962 B | 11/2015 |
| CN | 105076653 A | 11/2015 |
| CN | 205017748 U | 2/2016 |
| CN | 205018213 U | 2/2016 |
| CN | 105471171 A | 4/2016 |
| CN | 205192045 U | 4/2016 |
| CN | 205214887 U | 5/2016 |
| CN | 205279531 U | 6/2016 |
| CN | 205409472 U | 8/2016 |
| CN | 205585245 U | 9/2016 |
| CN | 205624264 U | 10/2016 |
| CN | 106196797 A | 12/2016 |
| CN | 106395721 A | 2/2017 |
| CN | 106900971 A | 6/2017 |
| CN | 206303741 U | 7/2017 |
| CN | 206354340 U | 7/2017 |
| CN | 206413692 U | 8/2017 |
| CN | 206421974 U | 8/2017 |
| CN | 206433686 U | 8/2017 |
| CN | 206491262 U | 9/2017 |
| CN | 206547790 U | 10/2017 |
| CN | 206547794 U | 10/2017 |
| CN | 206642687 U | 11/2017 |
| CN | 107560269 A | 1/2018 |
| CN | 107735632 A | 2/2018 |
| CN | 207141826 U | 3/2018 |
| CN | 104382495 B | 4/2018 |
| CN | 207201937 U | 4/2018 |
| CN | 207435060 U | 6/2018 |
| CN | 207531846 U | 6/2018 |
| CN | 108592242 A | 9/2018 |
| CN | 207831749 U | 9/2018 |
| CN | 108669282 A | 10/2018 |
| CN | 208371573 U | 1/2019 |
| CN | 208722311 U | 4/2019 |
| CN | 208724808 U | 4/2019 |
| CN | 106885399 B | 5/2019 |
| CN | 109938154 A | 6/2019 |
| CN | 109997949 A | 7/2019 |
| CN | 110017644 A | 7/2019 |
| CN | 209074505 U | 7/2019 |
| CN | 209131234 U | 7/2019 |
| CN | 209185627 U | 8/2019 |
| CN | 209234876 U | 8/2019 |
| CN | 209300170 U | 8/2019 |
| CN | 209416011 U | 9/2019 |
| CN | 209607024 U | 11/2019 |
| CN | 110623134 A | 12/2019 |
| CN | 210017720 U | 2/2020 |
| CN | 210201635 U | 3/2020 |
| CN | 210248241 U | 4/2020 |
| CN | 210299346 U | 4/2020 |
| CN | 210522775 U | 5/2020 |
| CN | 210747049 U | 6/2020 |
| CN | 210871377 U | 6/2020 |
| CN | 111434235 A | 7/2020 |
| CN | 210989501 U | 7/2020 |
| CN | 211019789 U | 7/2020 |
| CN | 211121668 U | 7/2020 |
| CN | 110159510 B | 8/2020 |
| CN | 211400349 U | 9/2020 |
| CN | 211451488 U | 9/2020 |
| CN | 211538150 U | 9/2020 |
| CN | 111854255 A | 10/2020 |
| CN | 211778764 U | 10/2020 |
| CN | 212027437 U | 11/2020 |
| CN | 212029991 U | 11/2020 |
| CN | 112042803 A | 12/2020 |
| CN | 212232975 U | 12/2020 |
| CN | 212566405 U | 2/2021 |
| CN | 212814022 U | 3/2021 |
| CN | 112656223 A | 4/2021 |
| CN | 212912866 U | 4/2021 |
| CN | 213126915 U | 5/2021 |
| CN | 213236056 U | 5/2021 |
| CN | 213273287 U | 5/2021 |
| CN | 213273290 U | 5/2021 |
| CN | 112956904 A | 6/2021 |
| CN | 213850302 U | 8/2021 |
| CN | 214039148 U | 8/2021 |
| CN | 214103051 U | 9/2021 |
| CN | 214196593 U | 9/2021 |
| CN | 107279447 B | 10/2021 |
| CN | 214316889 U | 10/2021 |
| CN | 214334969 U | 10/2021 |
| CN | 214483105 U | 10/2021 |
| CN | 113693445 A | 11/2021 |
| CN | 113720045 A | 11/2021 |
| CN | 214710112 U | 11/2021 |
| CN | 215016194 U | 12/2021 |
| CN | 215016201 U | 12/2021 |
| CN | 215379400 U | 12/2021 |
| CN | 215602985 U | 1/2022 |
| CN | 215602986 U | 1/2022 |
| CN | 215684620 U | 2/2022 |
| CN | 215708455 U | 2/2022 |
| CN | 215765914 U | 2/2022 |
| CN | 215809525 U | 2/2022 |
| CN | 215864155 U | 2/2022 |
| CN | 216293771 U | 4/2022 |
| CN | 216612056 U | 5/2022 |
| CN | 216720719 U | 6/2022 |
| CN | 112129035 B | 7/2022 |
| CN | 217012616 U | 7/2022 |
| CN | 217064180 U | 7/2022 |
| CN | 217083010 U | 7/2022 |
| CN | 217089443 U | 8/2022 |
| CN | 217160334 U | 8/2022 |

(56) References Cited

FOREIGN PATENT DOCUMENTS

| | | | |
|---|---|---|---|
| CN | 217284664 | U | 8/2022 |
| CN | 217487541 | U | 9/2022 |
| CN | 217504052 | U | 9/2022 |
| CN | 217549538 | U | 10/2022 |
| CN | 217659303 | U | 10/2022 |
| CN | 115253764 | A | 11/2022 |
| CN | 115451627 | A | 12/2022 |
| CN | 217986576 | U | 12/2022 |
| CN | 218083680 | U | 12/2022 |
| CN | 115624283 | A | 1/2023 |
| CN | 218469280 | U | 2/2023 |
| CN | 218495421 | U | 2/2023 |
| CN | 218606164 | U | 3/2023 |
| CN | 218672741 | U | 3/2023 |
| CN | 218790281 | U | 4/2023 |
| CN | 218864540 | U | 4/2023 |
| CN | 219037180 | U | 5/2023 |
| CN | 113665971 | B | 6/2023 |
| CN | 116262007 | A | 6/2023 |
| CN | 219146676 | U | 6/2023 |
| CN | 219498505 | U | 8/2023 |
| CN | 116759902 | A | 9/2023 |
| CN | 116817503 | A | 9/2023 |
| CN | 112203521 | B | 10/2023 |
| CN | 219782282 | U | 10/2023 |
| CN | 117017068 | A | 11/2023 |
| CN | 117128681 | A | 11/2023 |
| CN | 220061962 | U | 11/2023 |
| CN | 117223784 | A | 12/2023 |
| CN | 220192836 | U | 12/2023 |
| CN | 117450705 | A | 1/2024 |
| CN | 220403784 | U | 1/2024 |
| CN | 117899996 | A | 4/2024 |
| CN | 117928143 | A | 4/2024 |
| CN | 220755136 | U | 4/2024 |
| CN | 220824679 | U | 4/2024 |
| CN | 117999446 | A | 5/2024 |
| CN | 220897868 | U | 5/2024 |
| CN | 221012901 | U | 5/2024 |
| CN | 118383446 | A | 7/2024 |
| CN | 118383447 | A | 7/2024 |
| CN | 118383448 | A | 7/2024 |
| CN | 221324786 | U | 7/2024 |
| CN | 221356582 | U | 7/2024 |
| CN | 221432688 | U | 7/2024 |
| CN | 118442732 | A | 8/2024 |
| CN | 118489792 | A | 8/2024 |
| CN | 221635548 | U | 9/2024 |
| CN | 114484960 | B | 10/2024 |
| CN | 112556240 | B | 3/2025 |
| EP | 3 659 827 | B1 | 6/2021 |
| JP | 63-90156 | A | 4/1988 |
| JP | 64-38987 | A | 2/1989 |
| JP | 2000-88415 | A | 3/2000 |
| JP | 2000-201626 | A | 7/2000 |
| JP | 2000-253835 | A | 9/2000 |
| JP | 2001-124453 | A | 5/2001 |
| JP | 2001-270410 | A | 10/2001 |
| JP | 2002-69475 | A | 3/2002 |
| JP | 2002-320198 | A | 10/2002 |
| JP | 2003-237899 | A | 8/2003 |
| JP | 2004-348330 | A | 12/2004 |
| JP | 2005-221212 | A | 8/2005 |
| JP | 2006-152982 | A | 6/2006 |
| JP | 2008-286469 | A | 11/2008 |
| JP | 2010-111546 | A | 5/2010 |
| JP | 2012-55189 | A | 3/2012 |
| JP | 2013-35600 | A | 2/2013 |
| JP | 2013-239819 | A | 11/2013 |
| JP | 2015-52432 | A | 3/2015 |
| JP | 2015-99535 | A | 5/2015 |
| JP | 2016-173258 | A | 9/2016 |
| JP | 2017-42180 | A | 3/2017 |
| JP | 2018-39562 | A | 3/2018 |
| JP | 2018-148053 | A | 9/2018 |
| JP | 2019-151798 | A | 9/2019 |
| JP | 2020-107558 | A | 7/2020 |
| JP | 2021-113621 | A | 8/2021 |
| JP | 2021-170800 | A | 10/2021 |
| JP | 2022-3106 | A | 1/2022 |
| JP | 2023-184445 | A | 12/2023 |
| KR | 10-1000916 | B1 | 12/2010 |
| KR | 10-2011-0005972 | A | 1/2011 |
| KR | 10-2012-0045551 | A | 5/2012 |
| KR | 10-1165922 | B1 | 7/2012 |
| KR | 10-2012-0099678 | A | 9/2012 |
| KR | 10-2013-0122312 | A | 11/2013 |
| KR | 10-2014-0033630 | A | 3/2014 |
| KR | 10-2015-0065638 | A | 6/2015 |
| KR | 10-1546476 | B1 | 8/2015 |
| KR | 10-1653949 | B1 | 9/2016 |
| KR | 10-1778468 | B1 | 9/2017 |
| KR | 10-1820801 | B1 | 1/2018 |
| KR | 10-2018-0075359 | A | 7/2018 |
| KR | 10-2052104 | B1 | 12/2019 |
| KR | 10-2020-0002160 | A | 1/2020 |
| KR | 10-2022-0099857 | A | 7/2022 |
| KR | 10-2415809 | B1 | 7/2022 |
| WO | WO 2012/055189 | A1 | 5/2012 |
| WO | WO 2015/052432 | A2 | 4/2015 |
| WO | WO 2015/135966 | A1 | 9/2015 |
| WO | WO 2017/042180 | A1 | 3/2017 |
| WO | WO 2018/039562 | A1 | 3/2018 |
| WO | WO 2020/107558 | A1 | 6/2020 |
| WO | WO 2020/120951 | A3 | 6/2020 |
| WO | WO 2021/113621 | A1 | 6/2021 |

* cited by examiner

SEALING ASSEMBLY FOR EVAPORATOR

CROSS REFERENCE TO RELATED APPLICATIONS

The present application claims the benefit of Chinese Patent Application Nos. 202422199009.1 filed on Sep. 6, 2024 and 202422121943.1 filed on Aug. 29, 2024. All the above are hereby incorporated by reference in their entirety.

TECHNICAL FIELD

This application relates to the technical field of a cold drink dispenser device, particularly to a sealing assembly for an evaporator.

BACKGROUND

A cold drink dispenser is a device specifically designed for making cold beverages, primarily comprising two core systems: a refrigeration system and a mixing system. The refrigeration system is responsible for cooling the ingredients, while the mixing system blends them to ensure a uniform distribution. The evaporator of a cold drink dispenser is a crucial component of its refrigeration system, used for refrigerating materials to produce refreshing and smooth snow-melt-like beverages. During the operation of a cold drink dispenser, one end of the rotating shaft is located outside the evaporator. To prevent material leakage through the rotating shaft, which could lead to potential hygiene issues and safety risks, a sealing device is required between the rotating shaft and the evaporator.

However, the current sealing devices between the rotating shaft and the evaporator have some deficiencies: typically, there is only one seal, and this seal cannot self-compensate for wear during use. As the sealing performance gradually decreases, it may lead to material leakage, which can cause mold growth inside the machine and, in extreme cases, may even trigger circuit short-circuits, posing serious safety hazards.

Therefore, there is an urgent need to design a sealing assembly for the evaporator to address the aforementioned issues.

SUMMARY

The technical problem to be solved by this application is to provide a sealing assembly for an evaporator that exhibits strong durability and sealing performance.

To address the aforementioned technical problem, this application presents a sealing assembly for an evaporator, wherein the evaporator includes an evaporator casing arranged along a horizontal direction and an inner axial tube disposed along the central axis of the evaporator casing, with a rotating shaft installed within the inner axial tube. The front end of the evaporator casing is provided with a front opening, in which a sealing assembly is sleeved over the surface of the rotating shaft. The sealing assembly comprises an outer sleeve in contact with the rotating shaft, a through sleeve embedded around the outer sleeve, and a fixed sleeve installed on the inner wall of the evaporator casing. The through sleeve passes through the front opening and is inserted into the fixed sleeve, with a first gasket sleeve disposed between the through sleeve and the evaporator casing. The inner perimeter of the fixed sleeve is provided with an inner sleeve in contact with the rotating shaft. The rear end of the inner axial tube is embedded in the rear end of the evaporator casing, while the front end of the inner axial tube is in contact with the fixed sleeve.

As an improvement to the aforementioned solution, the rear end of the evaporator casing is provided with a rear opening, with a rear annular sleeve disposed inside the evaporator casing at the rear opening, and the rear end of the inner axial tube is placed within the rear annular sleeve and pressed against the inner wall of the rear opening.

As an improvement to the aforementioned solution, the outer sleeve is provided with a first contact portion on the side away from the evaporator casing, which is in contact with the rotating shaft.

As an improvement to the aforementioned solution, the outer sleeve is provided with a first sleeve portion and a second sleeve portion, forming a first groove between them. The through sleeve is provided with a first insertion portion that fits into the first groove.

As an improvement to the aforementioned solution, the through sleeve is also provided with a thickened portion that covers the first gasket sleeve.

As an improvement to the aforementioned solution, the fixed sleeve extends inward and outward from the second sleeve portion to form a first fixed portion in contact with the second sleeve portion and a second fixed portion in contact with the inner wall of the evaporator casing, creating a second groove between the first and second fixed portions. The through sleeve is provided with a second insertion portion that fits into the second groove.

As an improvement to the aforementioned solution, both sides of the second sleeve portion and the first gasket sleeve are provided with at least one protruding reinforcement strip. The first insertion portion, the first fixed portion, the thickened portion, and the outer wall of the evaporator casing are provided with reinforcement tracks that match the reinforcement strips.

The reinforcement strips on both sides of the second sleeve portion are respectively engaged with the reinforcement tracks of the first insertion portion and the first fixed portion, while the reinforcement strips on both sides of the first gasket sleeve are respectively engaged with the reinforcement tracks of the thickened portion and the outer wall of the evaporator casing.

As an improvement to the aforementioned solution, the inner sleeve is disposed within the first fixed portion and provided with a second contact portion in contact with the rotating shaft.

As an improvement to the aforementioned solution, the fixed sleeve is also provided with a positioning portion disposed inside the front end of the inner axial tube.

As an improvement to the aforementioned solution, a second gasket sleeve is disposed within the first fixed portion, positioned between the inner sleeve and the positioning portion.

The beneficial effects of implementing this application are as follows:

The sealing assembly for the evaporator of this application is provided with an outer sleeve and an inner sleeve in contact with the rotating shaft, offering strong sealing performance. Furthermore, through the combination of the through sleeve, the fixed sleeve, and the first gasket sleeve, a multi-layer structure for fixing and vibration reduction is formed, enhancing structural stability. The sealing assembly for the evaporator of this application also further strengthens the structural stability between components through the cooperation of the reinforcement strips and reinforcement tracks.

DESCRIPTION OF EMBODIMENTS

To make the purpose, technical scheme, and advantages of the application clearer, a further detailed description of the application will be provided below in conjunction with the accompanying drawings. It is hereby stated that the terms "up," "down," "left," "right," "front," "rear," "inner," "outer," and other positional expressions appearing or soon to appear in the text are based solely on the accompanying drawings of the application and do not constitute specific limitations to the application.

Figure 1:
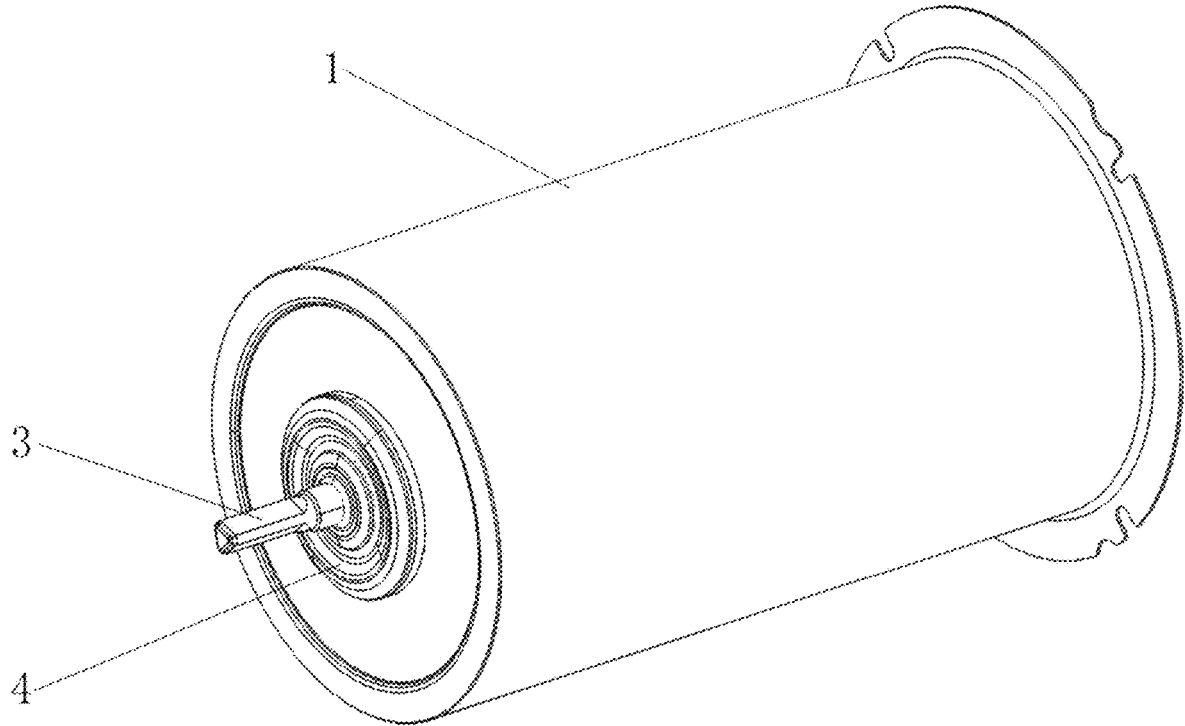
FIG. 1 is a three-dimensional structural diagram of the sealing assembly of the evaporator of the application.
Figure 2:
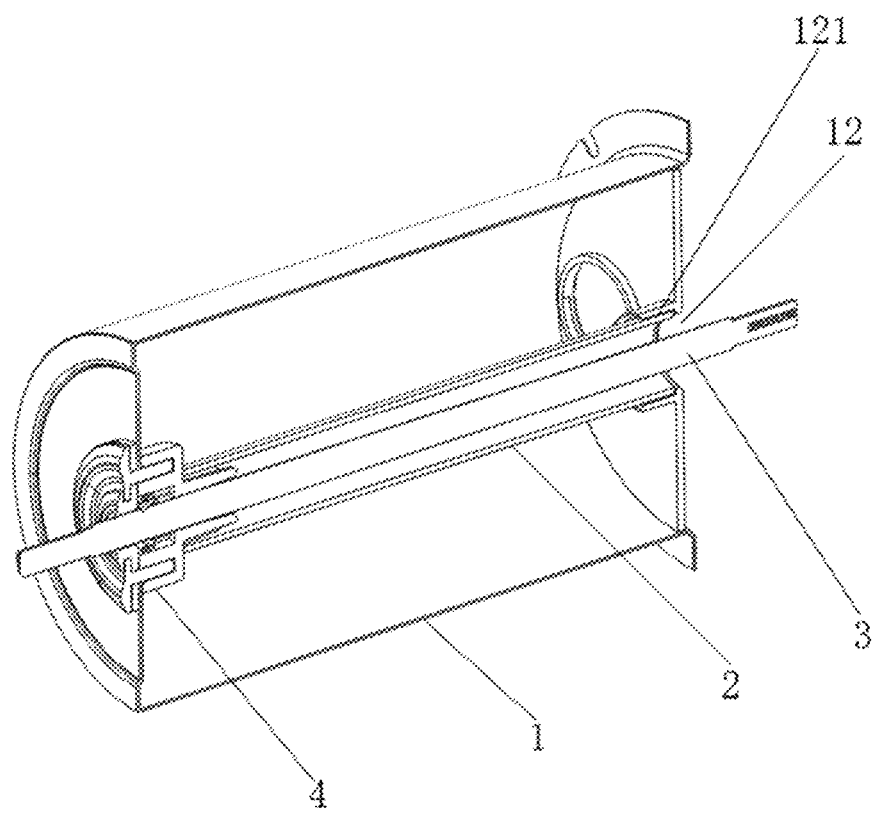
FIG. 2 is a sectional view of the sealing assembly of the evaporator of the application.
Figure 3:
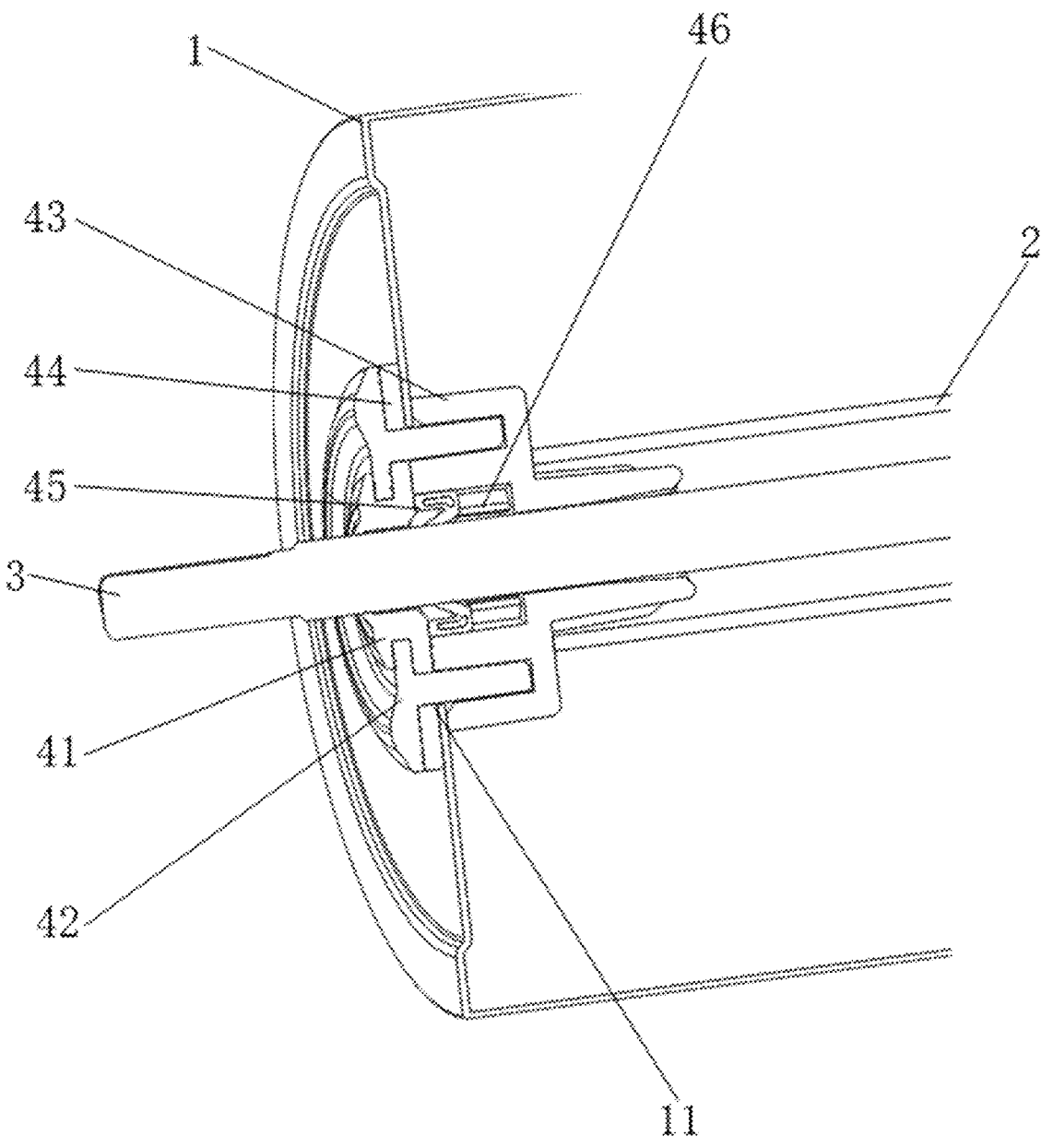
FIG. 3 is a sectional view of the front end of the evaporator casing in the sealing assembly of the evaporator of the application.

As shown in FIGS. 1 to 3, the evaporator includes an evaporator casing 1 arranged in a horizontal direction and an inner axial tube 2 arranged along the central axis of the evaporator casing 1. A rotating shaft 3 is disposed within the inner axial tube 2. The front end of the evaporator casing 1 is provided with a front end opening 11, and a sealing assembly 4 sleeved over the surface of the rotating shaft 3 is disposed in the front end opening 11.

The sealing assembly 4 includes an outer sleeve 41 in contact with the rotating shaft 3, a through sleeve 42 embedded around the outer sleeve 41, and a fixed sleeve 43 disposed on the inner wall of the evaporator casing 1.

The through sleeve 42 passes through the front end opening 11 and is embedded in the fixed sleeve 43. A first gasket sleeve 44 is disposed between the through sleeve 42 and the evaporator casing 1. An inner sleeve 45 in contact with the rotating shaft 3 is disposed inside the fixed sleeve 43.

The rear end of the inner axial tube 2 is embedded in the rear end of the evaporator casing 1, and the front end of the inner axial tube 2 is in contact with the fixed sleeve 43.

Therefore, the sealing assembly of the evaporator of the application features strong sealing performance due to the outer sleeve 41 and inner sleeve 45 in contact with the rotating shaft 3. Additionally, the combination of the through sleeve 42, fixed sleeve 43, and first gasket sleeve 44 forms a multi-layer fixed damping structure, enhancing structural stability.

Specifically, to fix the rear end of the inner axial tube 2, the rear end of the evaporator casing 1 is equipped with a rear opening 12, and a rear end collar 121 is provided inside the evaporator casing 1 at the rear opening 12. The rear end of the inner axial tube 2 is placed in the rear end collar 121 and pressed against the inner wall of the rear opening 12.

Figure 4:
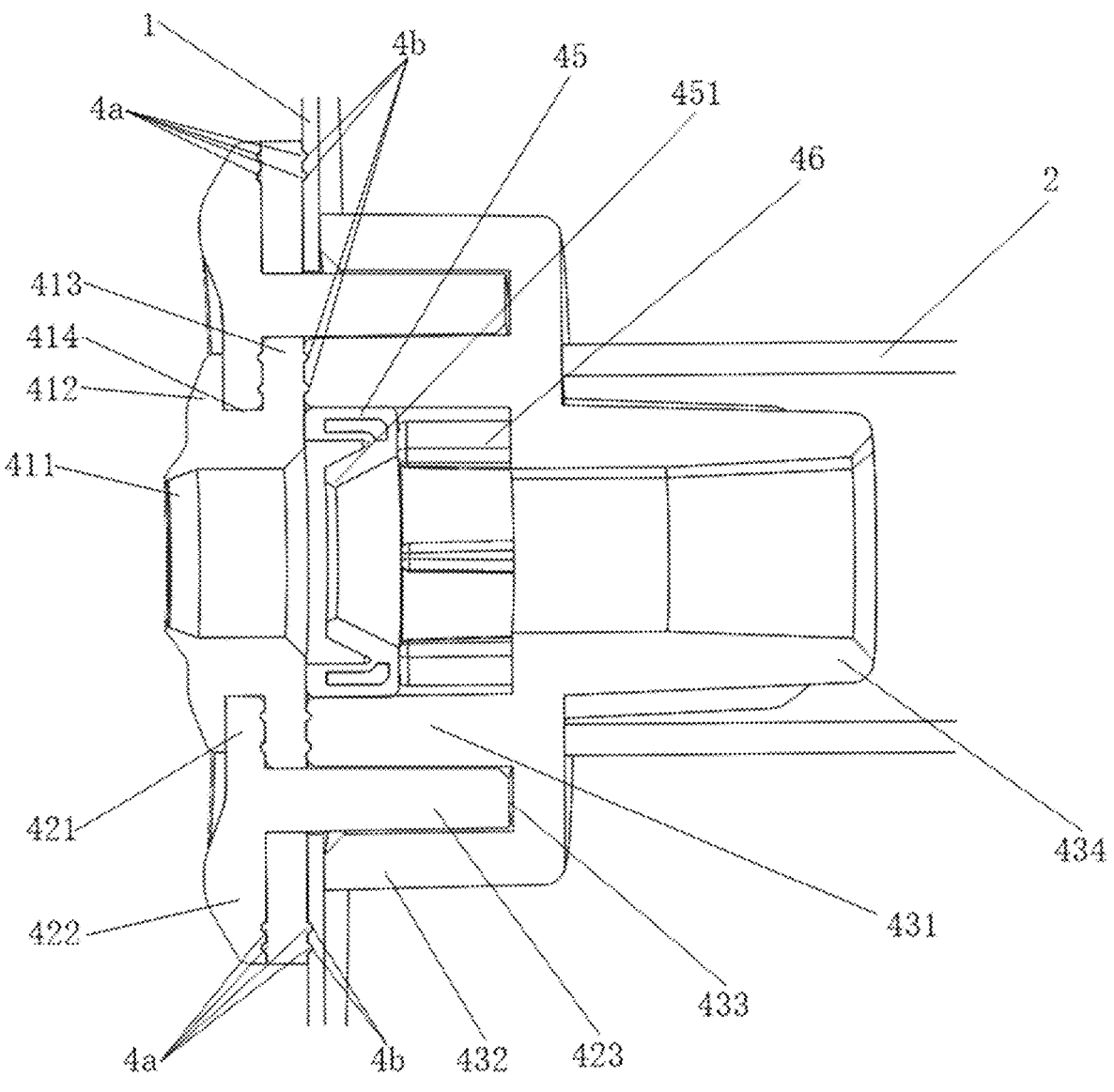
FIG. 4 is a sectional view of the front end of the evaporator casing in the sealing assembly of the evaporator of the application, with the rotating shaft removed.

As shown in FIGS. 3 and 4, to reduce the contact between the outer axial sleeve 41 and the rotating shaft 3, thereby lowering friction, the outer axial sleeve 41 is equipped with a first contact portion 411 on the side facing away from the evaporator casing 1 that makes contact with the rotating shaft 3.

To allow the through sleeve 42 to be embedded around the outer axial sleeve 41, specifically, the outer axial sleeve 41 is provided with a first axial sleeve portion 412 and a second axial sleeve portion 413, with a first groove 414 formed between the first axial sleeve portion 412 and the second axial sleeve portion 413.

The through sleeve 42 is equipped with a first insertion portion 421 that fits into the first groove 414, with the first insertion portion 421 placed into the first groove 414.

The through sleeve 42 is also provided with a thickened portion 422 that covers the first gasket sleeve 44. The thickened portion 422 covers the first gasket sleeve 44, providing a more streamlined appearance and enhancing the absorption of vibrational energy.

To allow the through sleeve 42 to be embedded in the fixing sleeve 43, specifically: the fixing sleeve 43 is provided with a first fixing portion 431 that contacts the second axial sleeve portion 413 and a second fixing portion 432 that contacts the inner wall of the evaporator casing 1, with a second groove 433 formed between the first fixing portion 431 and the second fixing portion 432.

The through sleeve 42 is equipped with a second insertion portion 423 that fits into the second groove 433, with the second insertion portion 423 placed into the second groove 433.

Both sides of the second axial sleeve portion 413 and the first gasket sleeve 44 are provided with at least one protruding reinforcement strip 4a.

The first insertion portion 421, the first fixing portion 431, the thickened portion 422, and the outer wall of the evaporator casing 1 are all provided with reinforcement tracks 4b that fit the reinforcement strips 4a.

The reinforcement strips 4a on both sides of the second sleeve portion 413 are respectively inserted into the reinforcement tracks 4b of the first embedding portion 421 and the first fixing portion 431, while the reinforcement strips 4a on both sides of the first gasket sleeve 44 are respectively inserted into the reinforcement tracks 4b of the thickened portion 422 and the outer wall of the evaporator casing 1.

The inner sleeve 45 is disposed within the first fixing portion 431 and is equipped with a second contact portion 451 that abuts against the rotating shaft 3. Both the outer sleeve 41 and the inner sleeve 45 are made of elastic materials such as rubber or nylon. After prolonged use, even when the first contact portion 411 and the second contact portion 451 undergo partial wear, the elastic properties of the outer sleeve 41 and the inner sleeve 45 still allow the first contact portion 411 and the second contact portion 451 to maintain contact with the rotating shaft 3, compensating for the wear.

The fixing sleeve 43 is also equipped with a locating portion 434 disposed inside the front end of the inner axial tube 2, which cooperates with the rear end ring sleeve 121 to fix the inner axial tube 2.

To further enhance the vibration reduction effect, a second gasket sleeve 46 is disposed inside the first fixing portion 431, positioned between the inner sleeve 45 and the locating portion 434.

The above description is the preferred embodiment of the present application. It should be noted that for those skilled in the art, without departing from the principles of the present application, several improvements and modifications can be made, which are also deemed to fall within the scope of protection of the present application.

What is claimed is:

1. A sealing assembly for an evaporator, wherein the evaporator comprises an evaporator casing arranged along a horizontal direction and an inner axial tube disposed along the central axis of the evaporator casing, with a rotating shaft set within the inner axial tube, and a front-end opening provided at the front end of the evaporator casing, wherein the sealing assembly is provided in the front-end opening and sleeved over the surface of the rotating shaft;

the sealing assembly comprises an outer sleeve in contact with the rotating shaft, a through sleeve embedded around the outer sleeve, and a fixing sleeve disposed on the inner wall of the evaporator casing;

the through sleeve passes through the front-end opening and is embedded in the fixing sleeve, with a first gasket sleeve provided between the through sleeve and the evaporator casing, and an inner sleeve in contact with the rotating shaft is provided around the inner perimeter of the fixing sleeve;

the rear end of the inner axial tube is embedded in the rear end of the evaporator casing, with the front end of the inner axial tube in contact with the fixing sleeve.

2. The sealing assembly for the evaporator according to claim 1, wherein a rear-end opening is provided at the rear end of the evaporator casing, with a rear-end ring sleeve disposed inside the evaporator casing at the rear-end opening, and the rear end of the inner axial tube is placed in the rear-end ring sleeve and pressed against the inner wall of the rear-end opening.

3. The sealing assembly for the evaporator according to claim 1, wherein the outer sleeve is provided with a first contact portion, on the side of the outer sleeve away from the evaporator casing, in contact with the rotating shaft.

4. The sealing assembly for the evaporator according to claim 1, wherein the outer sleeve is provided with a first sleeve portion and a second sleeve portion, forming a first groove between them;

the through sleeve is provided with a first embedding portion matchable with the first groove, with the first embedding portion inserted into the first groove.

5. The sealing assembly for the evaporator according to claim 4, wherein the through sleeve is also provided with a thickened portion covering the first gasket sleeve.

6. The sealing assembly for the evaporator according to claim 5, wherein the fixing sleeve is provided with a first fixing portion in contact with the second sleeve portion and a second fixing portion in contact with the inner wall of the evaporator casing from inside to outside, forming a second groove between the first fixing portion and the second fixing portion;

the through sleeve is provided with a second embedding portion matchable with the second groove, with the second embedding portion inserted into the second groove.

7. The sealing assembly for the evaporator according to claim 6, wherein at least one protruding reinforcement strip is provided on both sides of the second sleeve portion and the first gasket sleeve;

reinforcement tracks matchable with the reinforcement strips are provided on the first embedding portion, the first fixing portion, the thickened portion, and the outer wall of the evaporator casing;

the reinforcement strips on both sides of the second sleeve portion are respectively inserted into the reinforcement track of the first embedding portion and the reinforcement track of the first fixing portion, while the reinforcement strips on both sides of the first gasket sleeve are respectively inserted into the reinforcement track of the thickened portion and the reinforcement track of the outer wall of the evaporator casing.

8. The sealing assembly for the evaporator according to claim 6, wherein the inner sleeve is disposed within the first fixing portion, a second contact portion in contact with the rotating shaft is provided on the inner sleeve.

9. The sealing assembly for the evaporator according to claim 6, wherein the fixing sleeve is also provided with a locating portion disposed inside the front end of the inner axial tube.

10. The sealing assembly for the evaporator according to claim 9, wherein a second gasket sleeve is provided within the first fixing portion and disposed between the inner sleeve and the locating portion.

* * * * *